July 28, 1931.  E. RIEMENSCHNEIDER  1,816,231
WELDING MACHINE
Filed May 25, 1929   6 Sheets-Sheet 4

INVENTOR,
E. Riemenschneider
BY C. R. Halbert
E. L. Davis
ATTORNEYS

INVENTOR
E. Riemenschneider.
BY C. R. Halbert.
E. L. Davis.
ATTORNEYS.

Patented July 28, 1931

1,816,231

UNITED STATES PATENT OFFICE

ERNEST RIEMENSCHNEIDER, OF DETROIT, MICHIGAN, ASSIGNOR TO FORD MOTOR COMPANY, OF DEARBORN, MICHIGAN, A CORPORATION OF DELAWARE

WELDING MACHINE

Application filed May 25, 1929. Serial No. 366,038.

The object of my invention is to provide an electric welding machine for welding the spokes to the rim member of a steel spoked wheel.

A further object of my invention is to provide an electric welding machine which will progressively weld one end of a group of identical spokes to the wheel rim and which will automatically index the work to be welded so that each spoke may be welded by the same electrodes. The wheel to be welded is designed with a row of ten diagonal inner spokes extending between the hub member and the rim, a second row of ten diagonal spokes also extending between the inner part of the hub and the rim, this second row of spokes being slanted in the opposite direction to the first row, and a third row of spokes extending radially from the outer end of the hub member to the rim.

There are thus three distinct sets of spokes, each set consisting of ten identical spokes which are placed identically with the hub and rim member. No attempt is made in this machine to produce all of the welds of all of the spokes in one machine using the same set-up, but rather, the purpose of the machine is to produce progressively the welds at one end of all of the spokes of one group. Each spoke of each group being identical with the other spokes of the same group and being similarly placed with reference to the hub and rim member, it follows that all of the welds at one end of each group of spokes will be identical.

The desired procedure in manufacturing steel spoke wheels with the applicant's machine is to have six of the machines, each machine being similar to the rest of the machines in most respects, and to perform all of the welds on one end of each group of spokes with each machine, the work being transferred from one machine to the next to progressively make each of the groups of welds.

The most satisfactory method of operation consists in having one machine permanently equipped to perform all the welds on one end of each group of spokes and to operate all of the machines simultaneously so that a continuous production of the finished wheels is obtained.

Still a further object of my invention is to provide an electric welding machine which will automatically rotate the work-holder an amount equal to the spacing between each spoke of each group during each cycle of the electrodes and which will automatically shut the machine off when the work holder has completed one revolution.

Still a further object of my invention is to provide a welding machine having a driven shaft therein upon which a plurality of cams are mounted, two of the cam members operating a pair of electrodes through suitable levers and the third cam operating a clamping device to hold the wheel spokes in position.

Many types of wheels have been designed in which the spokes consist of heavy wires or rods welded at each end to the rim and hub members respectively. The advantages of this type of welded wheel over the old threaded spoke wire wheel structure are numerous, but up to the time of the applicant's machine it was not possible to produce such a wheel by the comparatively primitive methods employed. When the spokes were welded by acetylene or arc welding a non-uniform weld was invariably secured which tended to place unequal strains on the various spokes and which also had a very unsightly appearance.

Some success has been attained in the manufacture of welded wheels by butt welding the spokes individually, but the difficulty of securing a very close concentricity of the rim in relation to the hub and also of securing a uniform tension on all of the spokes made the finished wheels vary considerably as to their strength, some of the spokes being under a high stress while others were under no stress at all.

Special care has been provided in the applicant's device to produce uniform welds and to do this automatically with such precision that the only work which the operator is required to do is the placing of the rim and hub in the machine and the feeding of the spokes thereto. The welding, indexing, and stopping of the machine being entirely automatic.

Still a further object of my invention is to provide an electric welding machine for welding steel spoke wheels in which one of the electrodes is held in a stationary welding position and the other electrode held so as to be free to move in at least two directions while the weld is being made.

A much stronger construction is obtained in steel spoked wheels if the spokes are staggered and crossed. When such crossed spoke are being butt welded at the point where they intersected the rim or the hub member, the spokes become shorter by an amount equal to the metal flashed away. Due to the angularity of the spokes and the constant distance between the rim and hub member, the rim shifts a small amount circumferentially during the welding period to allow for the shortening of the spokes.

A problem was encountered due to the enormous wear on the electrodes when the wheel shifted circumferentially as the weld took place. If both electrodes are held in fixed position relative to each other, and one electrode is clamped to a spoke, the electrode in contact with the rim must slide relative thereto when the rim shifts circumferentially. This sliding action caused enormous wear on the electrode adjacent to the wheel rim.

The applicant has completely overcome this problem by allowing the electrode which is in contact with the rim to be resiliently held in position so that when the rim shifts relative to the spoke, the electrode in contact with this rim may also shift so that no sliding action occurs.

Still a further object of my invention is to resiliently mount the electrode which operates against the rim so that it will resiliently urge the rim against the spoke, and so that when part of the spoke is flashed away the rim will be immediately moved against the remaining part of the spoke to take up the length of spoke lost by flash.

Still a further object of my invention is to provide an automatic mechanism for stopping the machine after a complete cycle and to provide a manual control for stopping the machine after any weld of the cycle has been completed.

With these and other objects in view, my invention consists in the construction, combination and arrangement of the various parts of my improved device as described in the specification, claimed in my claims and illustrated in the accompanying drawings in which:

I have subdivided this machine into the following units, and the description of these units will be taken up in the order named.

The driving mechanism and cam shaft.

The electrodes and their operating mechanism, together with the clamping device.

The electrical equipment for producing the weld.

The work indexing mechanism, and

The manual and automatic control mechanism.

Referring to the accompanying drawings, I have used the reference numeral 10 to designate the body portion of my improved electric welding machine. This body 10 is a box-like structure having a rectangular cross section and housing practically all the working parts of the welding machine. Suitable openings are provided in this body portion to give access to the various parts, and doors are provided over these openings to protect the mechanism from dust and dirt.

Figure 6:
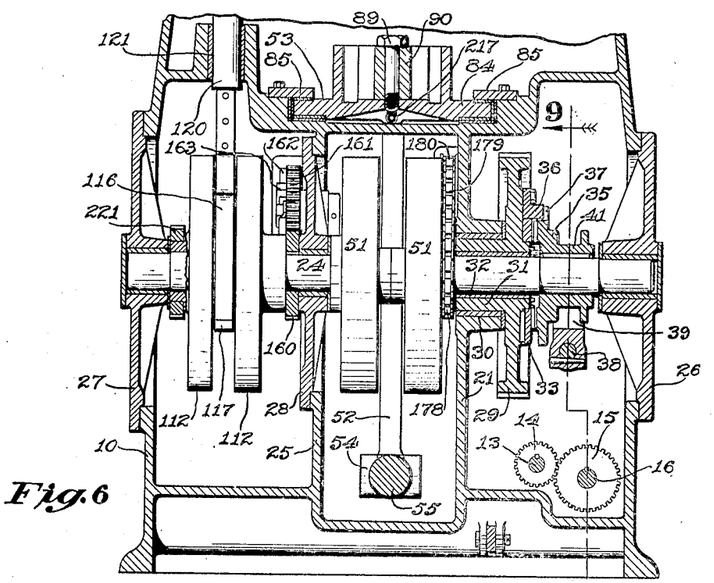
Figure 6 shows a sectional view taken on the line 6—6 of Figure 3.
Figure 9:
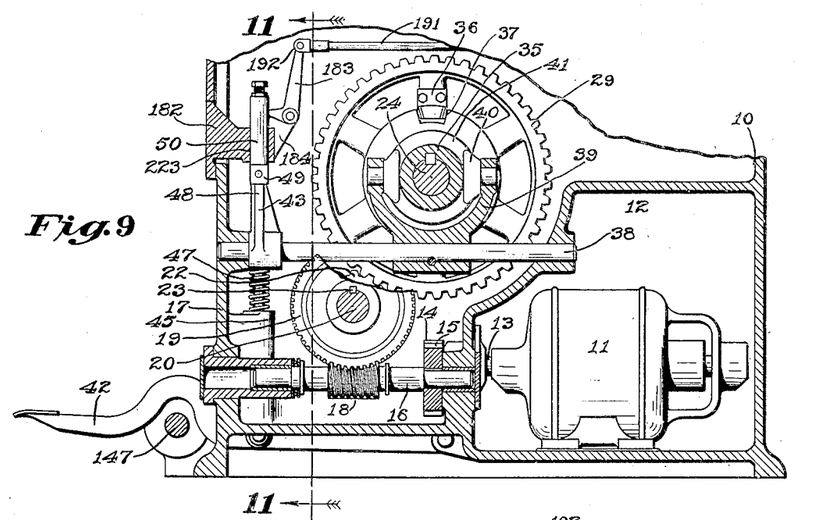
Figure 9 shows a vertical sectional view taken on the line 9—9 of Figure 6.

Referring to Figures 6 and 9, an electric driving motor 11 is housed in the base of the body 10 in a separate motor compartment 12. This compartment is provided because the rest of the lower part of the body forms an oil reservoir from which oil is forced to the various cams and gears which operate this device.

A motor driving shaft 13 extends through the forward vertical wall of the compartment 12 and a spur gear 14 is secured on the end of this drive shaft 13. A driven spur gear 15 is mounted so as to mesh with the gear 14 and is keyed to a worm shaft 16 rotatably mounted in suitable bearings in the forward wall of the compartment 12 and the forward wall 17 of the body 10. This worm shaft 16 is provided with a worm 18 formed integral therewith and which meshes with a worm wheel 19.

Figure 15:
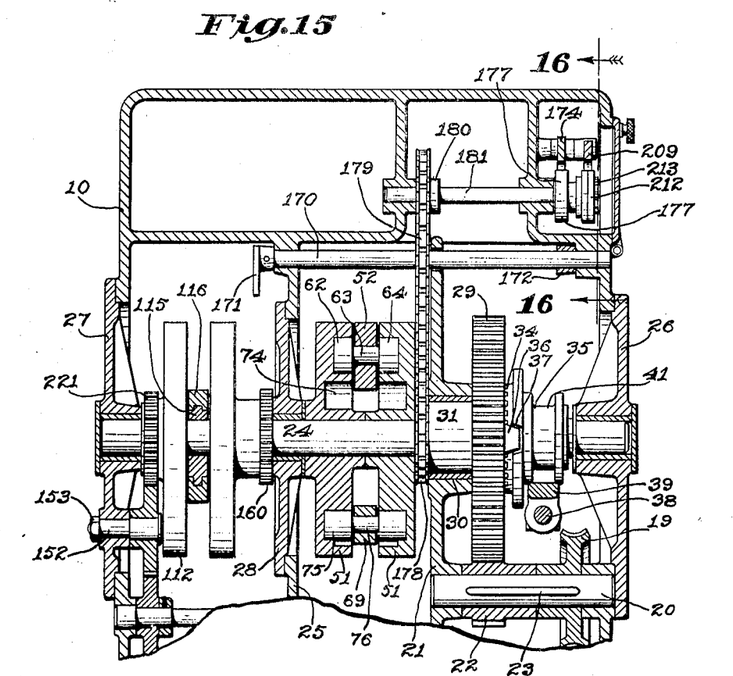
Figure 15 shows a sectional view through the main cam shaft and cam followers taken on the line 15—15 of Figure 3.

Referring to Figure 15, a jack shaft 20 is rotatably mounted crosswise to the body 10 in suitable bearings formed in the body 10 and in an inner wall 21 of the body 10. A pinion gear 22 together with the worm wheel 19 are keyed to this jack shaft 20 by means of a key 23, the worm wheel, pinion, and jack shaft thereby forming an integral unit rotatably mounted in the body 10.

A main cam shaft 24 is rotatably mounted crosswise to the body 10 and parallel to the shaft 20. The cam shaft 24 is provided with a large bull gear and a number of rather large cams all of which are secured to this shaft within the body of the machine. Suitable openings, of a diameter larger than these cams and driving gear, have been provided in the side walls of the body and in a second vertical web 25 so that the assembling of these various parts may be accomplished.

A pair of bearing plates 26 and 27 are secured to the right and left hand walls of the body 10, respectively, and a suitable bearing is provided in the center portion of each of these plates for rotatably mounting each end of the cam shaft 24. A third plate 28 is provided for the opening in the web 25, and a suitable bearing is also provided in this plate for the intermediate portion of the cam shaft 24. The wall 21 is provided with a bearing 30 which further supports the cam shaft 24 thru the hub portion of a bull gear 29 which is rotatably mounted in the bearing 30. The gear 29 is in constant mesh with the driving pinion 22.

This enlarged hub 31 on the gear 29 extends into the bearing 30 and is provided with a second bearing 32 in which the cam shaft 24 is rotatably mounted. The bull gear 29 is driven at all times while the motor 11 is operating. The driving gear 14 is driven by the electric motor 11 and drives the gear 15 which rotates the worm 18. The worm wheel 19, being in mesh with this worm 18, is thereby driven and drives the bull gear 29 through the pinion 22.

A ring of clutch teeth 33 are formed on the outer end of the bull gear 29 opposite the hub 31. These teeth are the means by which the cam shaft 24 is driven. A clutch sleeve 35 is slidably but non-rotatably mounted on the cam shaft 24 between the bull gear 29 and the plate 26, and has suitable clutch teeth 34 machined therein to mesh with the clutch teeth 33 on the bull gear 29.

A lug 36 is secured to the gear 29 and a slot 37 is provided in the face of the sleeve 35 so that when this sleeve is moved along the shaft 24, to engage the clutch teeth 33, the dog 36 will engage the slot 37 to secure a fixed relationship between the clutch sleeve 35 and the gear 29.

Referring to Figure 9, a clutch operating shaft 38 is rotatably mounted in suitable bearings in the forward wall of the compartment 12 and in the wall 17 of the body 10, and a clutch yoke 39 is secured to this shaft in such position that clutch shoes 40, which are mounted on the arms of the yoke 39, will engage a groove 41 in the clutch sleeve 35 so that rotation of the shaft 38 will operate the clutch 35 to thereby connect the shaft 24 with the gear 29.

A foot operating pedal 42 is pivotally mounted on the lower part of the forward wall of the compartment 12 and extends outwardly to the front of the welding machine in position convenient to the operator. The clutch shaft 38 is provided with a bell crank 43 adjacent to the forward wall 17. A rod 44 is pivotally connected to the pedal 42 near its center and extends upwardly, through a suitable boss 45 formed on the interior of the wall 17, and connects with a horizontal arm 46 of the bell crank 43. A spring 47 encircles the rod 44 between the boss 45 and the arm 46 to urge the foot pedal in its upward position and to urge the clutch 35 out of engagement with the gear 29.

The other arm 48 of the bell crank 43 is provided with a ratchet tooth 49 which coacts with a suitable spring operated ratchet dog 50 so that when the foot pedal 42 is depressed the clutch shaft 38 will be rotated by means of the arm 46 and the rod 44 and thereby throw the clutch 35 into engagement with the bull gear 29. The ratchet dog 50 co-acting with the tooth 49 to hold the clutch in engagement against the urging of the spring 47. If the dog 50 is raised out of engagement with the tooth 49, the spring 47 will release the clutch 35 and return the foot pedal 42 to the starting position.

The mechanism just described is placed between the vertical wall 21 and the outer wall of the body 10. The remaining two compartments of the lower portion of the machine are occupied by the cams and the controlling mechanism.

Figure 1:
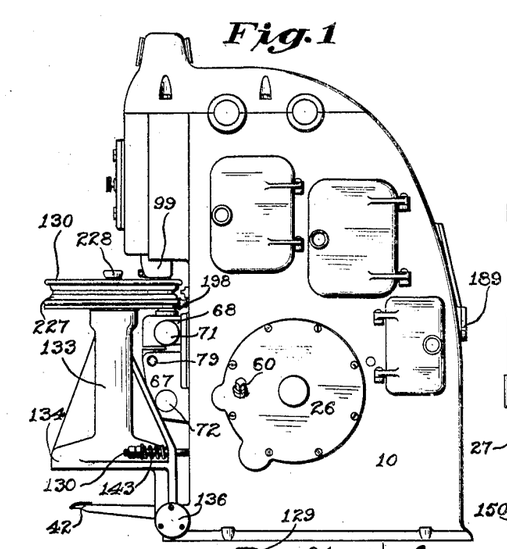
Figure 1 shows a side elevation of the welding machine with wheel, hub, and spoke in position to be welded.
Figure 2:
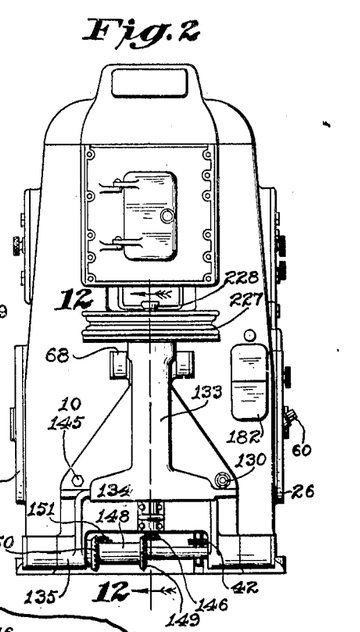
Figure 2 shows a front elevation of the machine shown in Figure 1.
Figure 3:
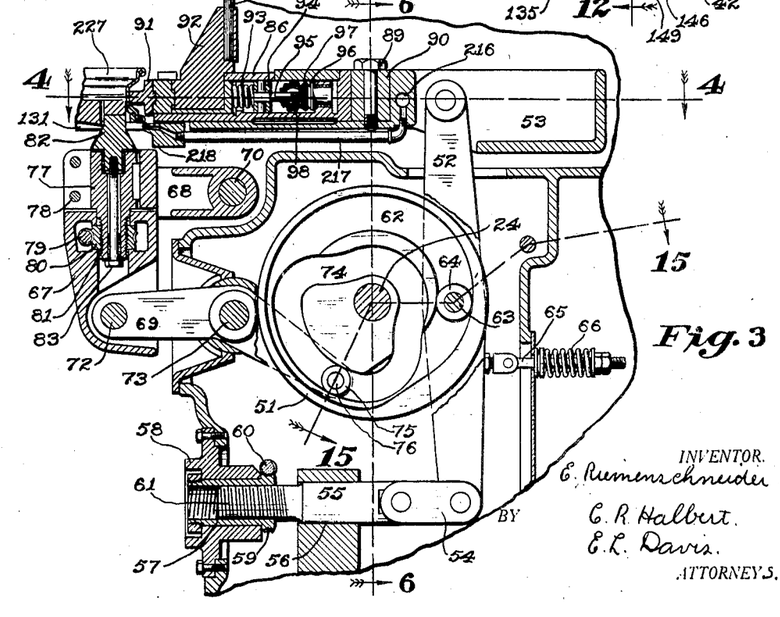
Figure 3 shows a vertical central sectional view through the lower electrode and clamping mechainsm, part of the operating arm being broken away to better illustrate the construction.

That portion of the cam shaft 24 between the walls 21 and 25 is provided with a pair of cams 51 which are rigidly secured to the cam shaft 24. Figures 3 and 15 illustrate quite clearly the unique construction of these cams wherein two homologous pairs of cam grooves are cut in these cams, one groove of each pair being cut deeper than the other pair to thereby form two independent tracks in each cam for two separate cam followers.

A cross slide 53, which will be described later, is operated by means of the cams 51. A beam 52 is pivotally mounted in this cross slide 53 and extends downwardly between the two cams 51 to the base of the machine. The lower end of the beam 52 is pivotally connected to a link 54 which is also pivotally connected to an adjusting screw 55. This screw 55 is slidably mounted in a bearing 56 cast between the walls 21 and 25.

An adjusting nut 57 is rotatably mounted in a bearing 58 which is bolted to the wall 17, and a worm wheel 59 is formed on the inner end of this nut 57. An adjusting worm 60 co-acts with this worm wheel 59 to rotate the adjusting nut 57 and thereby move the adjusting screw 55, which is non-rotatably but slidably held by means of the link 54, forwardly or rearwardly in the bearing 56 by means of a thread 61 machined on the forward end of the adjusting screw 55.

The cams 51 are provided with cam grooves 62. The center part of the beam 52 has a pin 63 secured therein and extending from opposite sides thereof into each of the cam grooves 62 where rollers 64 are rotatably mounted on this pin 63 to co-act with each of the grooves 62. The contour of this pair of grooves 62 is such that when the cam 51 is rotated one revolution the slide 53 will be held stationary for about ½ of the revolution, and then gradually move forwardly for about the next ⅓ of the revolution, and then return to its original position during the remaining ⅙ of the revolution.

A clevis and pin unit 65 is secured to the rear edge of the beam 52 and urges the rollers 64 against the outer walls of the cam grooves 62 by means of a spring 66. This unit is provided as a precautionary measure against the rollers 64 ever attempting to follow the other cam grooves which will be described later.

A clamping head 67 is mounted to be reciprocated vertically on the front wall 17 of the body 10 by means of a forked link 68 and a beam 69. Figure 3 shows this construction quite clearly, the link 68 being pivotally connected to the head 67 by means of the pins 71 and also pivotally connected to the body 10 by means of a pin 70. The lower part of the head 67 is pivotally connected to the outer ends of the beam 69 by means of a pin 72. The beam 69 is also pivotally mounted in the forward wall 17 by means of a pin 73.

From this construction it may be seen that the head 67 is free to move vertically in an arc while and yet always remaining parallel to the body of the machine.

The cams 51 are provided with a second pair of cam grooves 74 into which extend suitable rollers 75 which are rotatably mounted on the ends of pins 76 secured to the inner end of the beam 69 which extends between the two cams 51. It will be noted that the grooves 74 are cut deeper and narrower into the cams 51 than the grooves 62, so that the movement of the rollers 75 is at all times independent of the grooves 62 and depends only upon the contour of the grooves 74.

The contour of these grooves 74 is such that during the first quarter of a revolution of the cams 51, the head 67 is lowered to its lowest position, during the next quarter of a revolution the head is held stationary, and during the next quarter the head is raised to its upper position and during the last quarter the head is held in this upper position. The sequence of the movements of the head 67 and the cross slide 53 will be gone into more fully later.

The head 67 is provided with an adjustable clamping die 77 which is capable of being adjusted in a vertical direction. The upper portion of the head 67 is bored out to receive this clamping die 77 and a vertical slot is provided in the head 67 adjacent to this bore so that the die 77 may be clamped securely therein by means of a pair of bolts 78. A worm and worm wheel 79 and 80, respectively, are mounted in the head 67, the interior of the worm wheel being threaded to co-act with suitable threads 81 formed on the lower ends of the die 77. By rotating the worm 79 the die 77 may be raised or lowered in the head 67. An anvil 82 is secured to the upper part of the die 77 by means of a bolt 83 and is suitably insulated therefrom to prevent welding current from flowing into the head 67.

Figures 4, 5, 16:
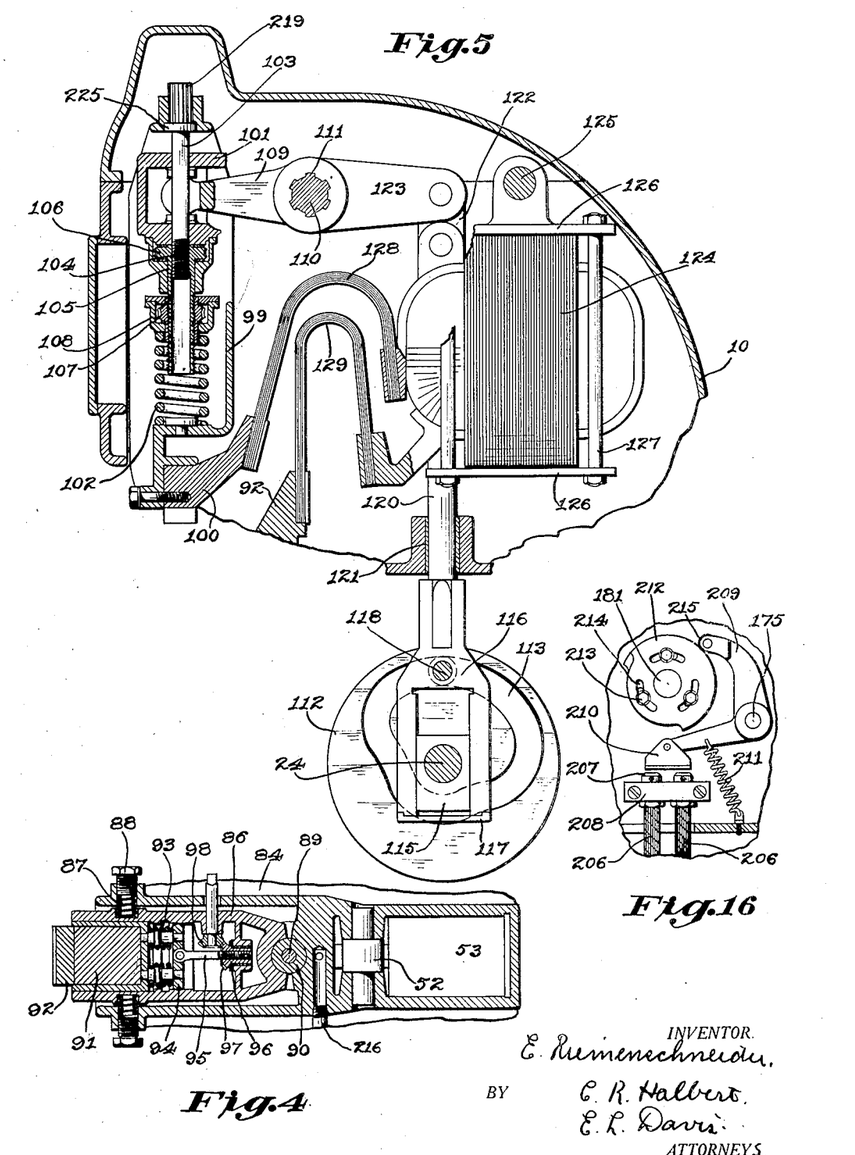
Figure 4 shows a sectional view taken on the line 4—4 of Figure 3.
Figure 5 shows a vertical central sectional view through the upper electrode head, the operating cam and follower being shown diagrammatically to better illustrate the operation.
Figure 16 shows a sectional view taken on the line 16—16 of Figure 15.

The construction of the cross slide 53 is shown by Figures 4 and 6. This slide 53 is of a rectangular shape and is slidably mounted in the body 10 by means of suitable bearing slides 84 formed on each side thereof and extending the length of the slide 53. Suitable gibs 85 secure this slide in position in a manner common to ordinary cross slide construction.

The forward part of the slide 53 is provided with an electrode holder 86 pivotally and resiliently mounted therein. A pair of compression springs 87 are adjustably mounted in the vertical walls of the forward end of the cross slide 53 by means of the screws 88 and bear against the sides of the electrode holder 86 at its forward end. The rear end of this electrode holder 86 is pivotally mounted in the center portion of the cross slide 53 by means of the pin 89 and a bearing sleeve 90.

The rear end of this holder 86 is formed with a semi-circular bearing which bears against the bearing sleeve 90 which is sunk into the cross slide 53. The direct thrust from the holder 86 is taken thru the bearing sleeve 90 to the cross slide 53, the pin 89 only holding the parts in position.

The outer end of the electrode holder 86 is recessed and is provided with a die 91 slidably mounted therein. An electrode 92 is secured to the outer end of this die 91. A pair of compression springs 93 are interposed between the electrode holder 86 and the die 91 so that the latter is resiliently held relative to the holder 86.

An adjusting device is provided for varying the spring pressure produced by the spring 93 on the die 91. This device consists of a plate 94 mounted for longitudinal movement in the holder 86 and having a rod 95 pivotally secured thereto and extending rearwardly where it is threaded into a nut 96. A bevel gear 97 is formed on the forward face of the nut 96 which meshes with a similar bevel gear 98 rotatably mounted in the holder 86, and operated from a convenient position on the outside of the cross slide 53.

The springs 93 are provided so that the electrode 92 may be forced against the rim of the wheel to be welded. When the cross slide 53 is brought into such position that the springs 93 will be compressed, the electrode is in position to weld the spoke. As the weld is being made the electrode 92 will be urged outwardly to keep a constant pressure against the rim and to move the rim outwardly an amount equal to the amount of the spoke flashed away by the weld.

A vertical slide is provided to operate the second electrode, as shown in Figure 5. This slide consists of a box-like structure 99 having an electrode 100 secured to its lower end. This slide is mounted in the upper part of the front portion of the body 10 so as to permit of a limited vertical sliding motion.

A head 101 is slidably mounted in the slide 99 and is resiliently supported therein by a compression spring 102. Two adjustments are provided for this head 99, the first adjustment is used to vary the spring pressure of the spring 102 and the second adjustment is used to vary the position of the slide 99 in relation to the head 101.

A vertical pin 103 is slidably mounted in the upper part of the slide 99 by means of the splines 219 and extends downwardly through the head 101 where thread 104 formed on this pin co-acts with suitable threads in an adjusting nut 105 to vary the vertical position of the pin 103 with reference to the head 101. The movement of the pin moves the head 101 relative to the slide 99 as the rib 225 on the pin 103 carries the weight of the slide.

A worm wheel 106 is formed integrally with the nut 105 and is secured in the head 101 so that it may be free to rotate but not free to move axially relative thereto. A suitable worm, not shown, is provided to rotate the worm wheel 106. It can thus be seen that when the worm wheel 106 is rotated, the position of the head 101 will be varied in reference to the slide 99 and the spring 102 will be either compressed or expanded. The spring 102 prevents the splines 219 from dropping out of the slide 99.

The nut 105 extends downwardly and is threaded on its exterior surface so that a worm wheel 107 may be screwed thereon. A housing 108 is mounted around the worm wheel 107 and the spring 102 is placed between this housing 108 and the lower wall of the slide 99.

An operating arm 109 is secured by means of the splines 111 to a cross shaft 110, the latter being rotatably mounted in the upper part of the body 10. The forward end of the arm 109 is forked so that it may straddle the pin 103, and is pivotally mounted in the upper part of the head 101 so that oscillation of the shaft 110 will reciprocate the head 101.

It will be recalled that there are three groups of spokes used in the wheel to be welded and that each of these groups of spokes have a weld on each end requiring a different welding die. The reason that two adjustments have been provided for adjusting the head 101 in the slide 99 is that the spring pressure for clamping the spokes must be kept uniform and the position of the slide 99 varied to suit the different electrodes used or to compensate for electrode wear. The position of the electrode used to weld the inner ends of the spokes will be different from the position of the electrode used to weld the outer ends.

The movement of the head 101 is constant, due to the development of the operating cam, and if a different movement of the electrode is required some adjustment must be made between this head and the electrode. The pressure of the spring 102 should be adjusted irrespective of the position of the electrode, however.

If it is desirable to lower or raise the slide 99 with respect to the head 101, the worm wheel 106 is rotated. The housing 108 which houses the worm 107 moves with the slide 99 thereby keeping the pressure of the spring 102 constant. The worm wheel 107 does not rotate, but the exterior threads on the nut 105 screw into the worm wheel 107 thereby moving the worm wheel 107, the housing 108, the pin 103, and the slide 99 in unison.

The pressure produced by the spring 102 is thereby not disturbed while the adjusting of the slide is in progress. If, however, this spring pressure is desired to be changed, the worm wheel 107 is rotated on the stationary nut 105 thereby compressing or extending the spring 102 to increase or decrease the spring pressure accordingly.

Figures 10, 11:
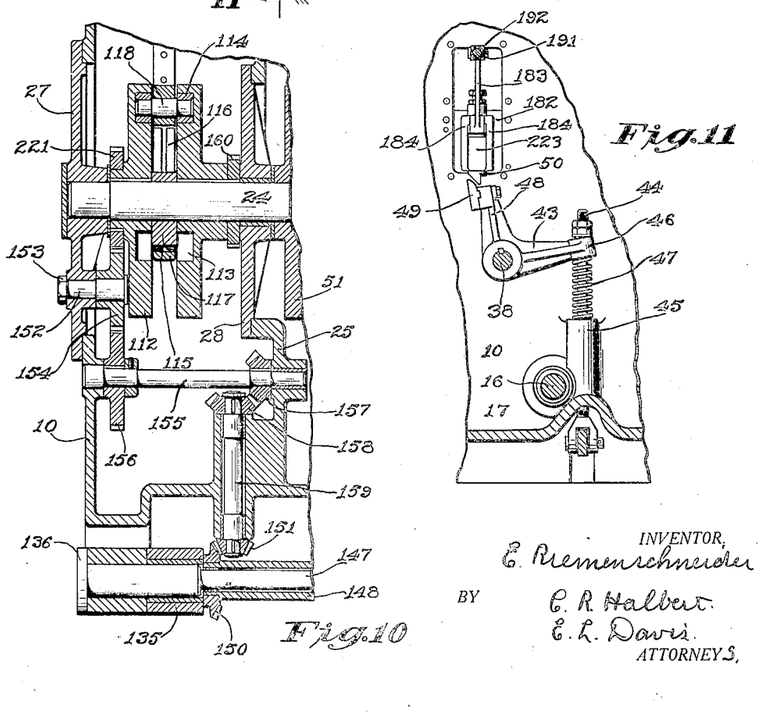
Figure 10 shows a sectional view taken on the line 10—10 of Figure 7.
Figure 11 shows a sectional view taken on the line 11—11 of Figure 9.
Figure 12:
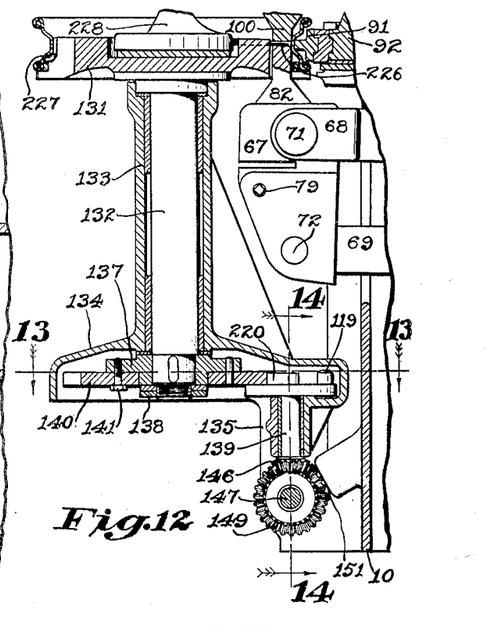
Figure 12 shows a sectional view taken on the line 12—12 of Figure 2.

A second pair of cams 112 are securely fastened to the shaft 24 between the plates 27 and 28. A single pair of homologous cam grooves 113 are provided in these cams into which a pair of rollers 114, shown by Figure 10, are rotatably mounted.

That portion of the shaft 24 between the cams 112 is provided with a bearing 115 which is slidably mounted in a yoke 116. An end plate 117 secures the two arms of the yoke 116 together. A pin 118 is transversely mounted in the upper part of the yoke 116 and extends into the grooves 113. The rollers 114 are rotatably mounted on the ends of this pin 118.

The upper end of the yoke 116 is secured to an operating rod 120. This rod 120 is slidably mounted in a suitable bearing 121 cast in the body 10. A link 122 is pivotally connected to the upper end of the rod 120, the other end of this link being also pivotally connected to an arm 123 which is secured to the shaft 110. The link 122 is necessary due to the rocking movement of the arm 123 and the straight vertical movement of the shaft 120.

When the pair of cams 112 are rotated through one revolution, the slide 99 will be raised during the first one quarter of a revolution, will remain in this upper position during the next quarter of a revolution, will return to the lower position during the third quarter and will be held in this lower position during the remaining quarter of the revolution.

A welding transformer 124, is hung from a cross shaft 125 by means of the plates 126 and tie rods 127. A pair of secondary leads 128 and 129 are secured to the electrodes 100 and 92, respectively. The operation of the electrodes and clamping device is as follows:

During the first quarter of a revolution of the cam shaft 24, the cam grooves in the cams 51 and 112 are so arranged that the electrodes and clamping head remain in their outward or inoperative position. This part of the revolution is used for indexing the wheel to be welded so that a spoke 226 can be placed in position to be welded. The indexing mechanism will be described later.

During the next quarter of a revolution the head 67 is raised to its upper position and the slide 99 is lowered so that the electrode 100 clamps the spoke 226 against the anvil 82 and securely holds same through the pressure of the spring 102. The cross slide 53 then forces the electrode 92 against the rim 227 by means of the cams 51.

During the next quarter of the revolution the current is fed to the electrodes and the spoke is welded to the rim. The springs 93 resiliently urge the electrode 92 against the rim 227 so that when the end of the spoke 226 in contact with the rim has been heated up to a fluid temperature, the electrode 92 and rim will both move outwardly the amount equal to the flash produced by the weld.

During the last quarter of the revolution the head 67 is lowered by means of the arm 69 and the groove 74 and the head 99 is raised by means of the arm 109, shaft 120, and groove 113 in cam 112. The cross slide 53 is also returned to the rear position away from the rim. If all the spokes have been welded, the machine is automatically stopped at this point. However, if more welds are to be made the cam shaft 24 does not stop but continues with the indexing operation as described first.

Referring to Figures 1, 2, 12 and 17, the wheel to be welded is held in a workholder 131 which has a center shaft 132 extending downwardly therefrom. This shaft is rotatably mounted in the vertical bearing 133.

Figure 17:
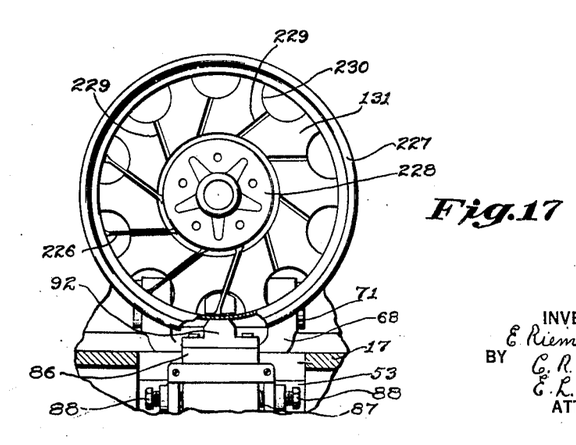
Figure 17 shows a top view of the work holder, with several spokes, the rim and the hub mounted thereon, and having parts broken away to better illustrate the manner of locating the spokes while they are being welded.

As has been stated there are six different types of welds to be made on the wheel and each weld requires a different work holder 131. The work holder illustrated is used during the welding of one of the inner groups of diagonal spokes 226 to the rim 227. This work holder consists of a disk having a center projection which locates a wheel hub member 228 centrally with the rim 227. A plurality of diagonal slots 229 are provided in the upper face of this disk so that the spokes may be placed therein and rotated by the work holder to position so that the clamping dies may clamp and the spokes in the correct position to be welded to the rim. Clearance openings 230 are provided in this disk so that the clamping dies may act on the spokes.

The work holders used when any of the other welds are made are quite similar to the one just described, but, of course, the slots 229 are differently placed and the clearance openings 230 are correspondingly changed to allow the clamping dies to clamp the spoke adjacent to the weld being made.

Figure 14:
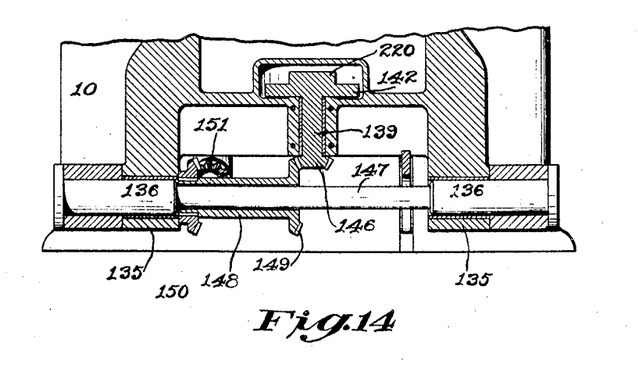
Figure 14 shows a sectional view taken on the line 14—14 of Figure 12.

A lower indexing housing 134 is formed integral with the bearing 133 and a pair of spaced arms 135 extend downwardly from the rear part of this housing. The arms 135 are pivotally mounted on a pair of pins 136, as shown in Figure 14, so that the housing 134 and the bearing 133, are free to pivot outwardly around the pins 136.

The shaft 132 is provided with a flange 137 secured to its lower end by means of nuts 138. The flange and nuts are both enclosed in the housing 134. A second shaft 139, offset from the shaft 132 but parallel to it, is rotatably mounted in the housing 134. There are ten welds to be made during each cycle of the machine and so it is necessary that the rim be rotated a tenth of a revolution for each weld.

A Geneva or intermittent motion has been provided between the shaft 139 and the shaft 132 so that one revolution of the shaft 139 will move the shaft 132 one tenth of a revolution. The movement of the shaft 139 is continuous while the shaft 132 is moved intermittently the motion of the shaft 132 taking place during about one quarter of a revolution of the shaft 139.

A ten toothed star wheel 140 is secured to and located on the flange 137 by means of the screws 141. A disk 142 is formed integrally with the upper part of the shaft 139 and a stud and roller 119 is mounted on the disk 142 in position to mesh with the teeth of the star wheel 140. An interlocking cam 220 is also provided on the disk 142 to hold the star wheel stationary during part of the revolution of the disk.

There are many forms of intermittent motion devices and the applicant does not desire to limit himself to this particular construction, as any form of intermittent device which will move the shaft 132 one tenth of a revolution during a part of the revolution of the shaft 139 will be suitable to operate the device.

A stud 130 is threaded into the end plate 117 of the body 10 and extends outwardly through one of the arms 135 of the housing 134. A coil spring 143 is placed upon the outer end of the stud 130 so that it will urge one arm 135 inwardly toward the body 10. A pair of lock nuts 144 are provided on the outer end of this stud 130 to hold the spring 143 against the arm.

Figure 13:
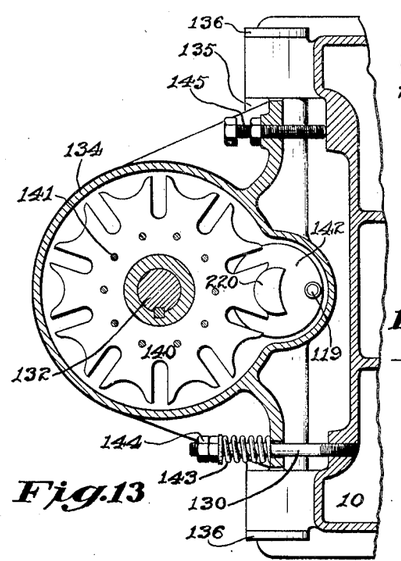
Figure 13 shows a sectional view taken on the line 13—13 of Figure 12.

The opposite arm 135 of the housing 134 is provided with an adjusting screw 145 which is threaded therein and extends through to position adjacent to the front wall of the body 10. As may be seen from Figure 13, when the screw 145 is adjusted inwardly the indexing housing 134 is rotated on the pins 136 away from the body 10. The spring 143 constantly urges the indexing housing toward the body. It is thus possible to accurately adjust the position of the rim 227 in relation to the electrodes by means of the screw 145, and to adjust the pressure of the spring 143 so that the wheel will be resiliently held in position to be welded by means of the nuts 144. It is necessary to support the work holder, as shown, so that the wheel may be pulled outwardly for removal. A bevel pinion 146 is formed integrally with the lower end of the shaft 139. The pins 136 are bored out to receive a stationary shaft 147 upon which is rotatably mounted a sleeve 148 having a bevel gear 149 in mesh with the bevel pinion 146. A second bevel gear 150 is secured to the other end of the sleeve 148 adjacent to the arm 135 and meshes with a bevel pinion 151 which is driven by the main cam shaft 24.

Referring to Figure 10, the outer cam 112 has a spur gear 221 secured to its hub adjacent to the plate 27. This gear is, of course, driven at all times with the cam 112 and the cam shaft 24. The plate 27 is provided with a stud 152 secured therein by means of a nut 153. Another spur gear 154 is rotatably mounted on this stud 152 in mesh with the gear 221.

A jack shaft 155 is rotatably mounted at each end in suitable bearings formed in the vertical wall 25 and the outer wall of the body 10. A spur gear 156 is keyed to this jack shaft 155 adjacent to the outer wall of the body and is in position to mesh with the gear 154. A bevel gear 157 is secured to the opposite end of the shaft 155 adjacent to the wall 25 and is in mesh with a similar bevel gear 158 secured to another shaft 159 which is rotatably mounted in suitable bearings in the forward wall 17 of the body 10. The shaft 159 is mounted perpendicularly to the shaft 155. The pinion 151 is secured to the forward end of this shaft.

The indexing of the work is thus accomplished as follows:

The cam shaft 24 drives the jack shaft 155 through the gears 221, 154, and 156. The shaft 159 is continuously driven with the jack shaft 155 through the bevel gears 157 and 158, and drives the sleeve 148 through the bevel gear and pinion 150 and 151, respectively. The shaft 139 is driven through the bevel gear 149 and pinion 146, and thereby drives the disk 142 in synchronism with the cam shaft 24.

The proportion of the gearing just described is so designed that one revolution of the cam shaft 24 rotates the disk 142 one revolution and the wheel to be welded one tenth of a revolution.

This rather long train of gears between the cam shaft 24 and the work holding shaft 32 is necessary to secure a fixed relationship between the work and the electrodes and to permit the work holder to be moved outwardly to remove the wheel. A drive accomplished through the use of universal joints and telescopic shafts may be substituted in place of this gearing if desired, however, the continuous gear drive herein shown is thought to be more reliable and better for this important function of indexing.

A mechanism, about to be described, is provided for allowing the cam shaft 24 to make ten revolutions and to then throw out the operating clutch 35 so that the machine may stop and the wheel may be removed and another wheel placed on the work holder to receive a similar series of welds. It sometimes happens that one of the spokes will be improperly placed in the electrode dies and it will be desirable to immediately stop the machine to prevent an improper weld. Provision has thus been made for stopping the machine at the completion of any weld, this stopping mechanism being entirely independent of the cycle controlling mechanism.

It might be thought that a suitable stopping mechanism could be provided for stopping the driving motor of the device, but this means has been found to operate too slowly. The means herein provided throws out the clutch sleeve 35 to practically instantaneously stop the machine independent of the driving motor.

Figures 7, 8:
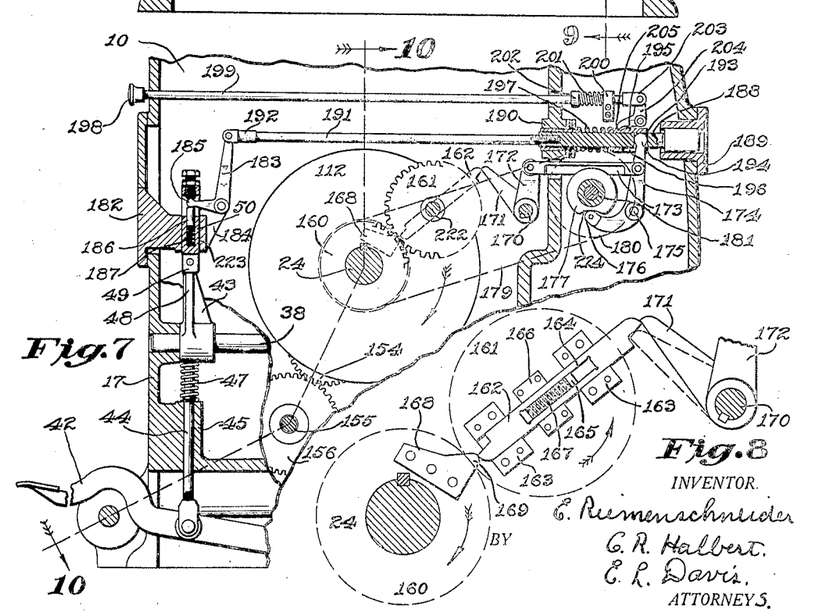
Figure 7 shows a view through the starting and stopping mechanism, parts which are in different planes of the device being shown in the same plane to better illustrate the construction.
Figure 8 shows a diagrammatic view of those parts which comprise the cycle timing mechanism.

A spur gear 160 is secured to the cam shaft 24 between the plate 28 and the inner cam 112. An idler gear 161 is rotatably mounted on a suitable stud 222 extending from the plate 28 and is in constant mesh with the gear 160. The gear 161 is provided with a control bar 162 diametrically mounted on the outer face of the gear so that it may be free to slide radially in either direction in suitable sliding bearings 163 secured to the face of the gear.

A slot 164 is provided in the center part of the bar 162 and an ear 165 extends into this slot. A plate 166 is secured to the center part of the idler gear 161 and has the ear 165 formed integrally therewith. A compression spring 167 is disposed in the slot 164 between one end of the slot and the ear 165 so that the opposite end of the slot 164 will contact with the ear 165.

The position just referred to is the inoperative position of the bar and is not shown in the drawings because it is thought the position wherein the spring 167 is compressed better illustrates the operation of the device. Suitable bearing caps are provided over the bearings 163 to hold the bar in place and a third bearing cap is provided over the plate 166 to secure the spring 167 in the slot 164. These plates are not down in the drawings because they are nothing more than common bearing caps and would obscure the construction of the device.

A lug 168 is riveted onto the face of the gear 160 and a projection 169 is formed integrally with this lug and extends radially to the face of the gear.

The purpose of this device is to allow the cam shaft 24 to make ten revolutions and to then stop the machine. The number of teeth in the gears 160 and 161 are so chosen that the gear 160 makes ten revolutions while the gear 161 makes only nine revolutions, the difference being one revolution in ten revolutions of the gear 160. If desired, the gear 161 may be made smaller than the gear 160 so that for ten revolutions of the latter gear, the gear 161 may make eleven revolutions, it being only necessary that a difference of one revolution, either faster or slower, of the gear 161 with reference to the gear 160 be provided.

If, as in the device shown the gear 160 is made to travel ten revolutions while the gear 161 rotates nine revolutions, a given tooth on the gear 160 will contact with a given tooth on the gear 161 every tenth revolution.

The projection 169 is secured on the gear 160 so that it will contact with one end of the bar 164 every tenth revolution of the gear 160. These parts are so proportioned that when the projection 169 meets the end of the bar 164 the spring 167 will be compressed and the bar will be moved lengthwise in the bearings 163 to the position shown in full lines in Figure 8. A very desirable feature of this construction is that the operation of the bar 162 takes place during only about 10 degrees of one revolution of the gear 160 so that the stopping of the device is accomplished almost instantaneously.

If desired, the gears 160 and 161 may be so proportioned that the gear 161 will either gain or lose one revolution in twenty revolutions of the gear 160. In this case the projection 169 contacts alternately with each end of the bar every tenth revolution. When this construction is used, the bar 162 must be resiliently held in the center of the gear 160. In either of the above described construction the bar 162 is moved radially by the projection 169 during only about 10 degrees of every tenth revolution of the gear 160.

A control shaft 170 is rotatably mounted in the walls 25, 21, and in the outer wall of the body 10. An arm 171 is secured to the inner end of the shaft 170 in position to contact with the end of the bar 162 when it is in its extended position. Suitable mechanism is controlled from the shaft 170 to stop the machine when this shaft is moved by the arm 171 and bar 162.

The operation of the cycle timing device is as follows:

The machine is started by pressing the foot pedal 42 which throws the clutch 35 into engagement thereby rotating the cam shaft 24. The gear 160 being secured to this cam shaft 24 rotates in a clockwise direction, referring to Figure 8, and rotates the gear 161 in a counter clockwise direction. The bar 162 rotates with the gear 161 but is resiliently held in a central position relative to this gear by the spring 167 so that each end of the bar 164 does not contact with the operating arm 171 which is secured to the shaft 170. When the gear 160 rotates ten revolutions, the projection 169 meets with the adjacent end of the bar 164 and forces this bar longitudinally against the action of the spring 167 so that the opposite end of this bar moves the arm 171 to the position shown in full lines in Figure 8.

It will be noted that as the projection 169 approaches within about ten degrees of the position shown in Figure 8, it will meet the adjacent end of the bar 162. A further movement of the projection to the position shown in Figure 8 will move this bar radially which will operate the arm 171.

This form of timing device is thought by the applicant to be new and is a very decided improvement over other forms of timing devices. It will be recalled that it is only during one quarter of a revolution of the cam shaft 24 that the electrodes and clamping device are in their outward position so that the work can be removed from the carrier. The indexing of the wheel carrier takes place during this quarter of a revolution of the cam shaft. The position in which the machine must be stopped is after the indexing and before the electrodes begin to clamp the spokes. The variation allowed for the stopped position is only about ten degrees of a revolution of the cam shaft 24.

It is, therefore, highly important that the cam shaft 24 is stopped within ten degrees of one revolution at the end of ten revolutions.

In the applicant's device the clutch is thrown out during about ten degrees of movement of the cam shaft 24 which is about one thirty-sixth of the revolution of the cam shaft.

If the ten to one reduction gearing were used to operate a clutch throw-out device and the same speed of operation were obtained which the applicant's device provides it would be necessary to throw out the clutch with a one degree movement or one three hundred and sixtieth part of a revolution of the operating gear. This the applicant believes to be highly improbable if not impossible to obtain.

The description of how the clutch mechanism is operated by the foot pedal 42 to throw the clutch 35 into engagement with the bull gear 29 has been given. The means for holding this gear into engagement that is by means of the ratchet 49 and the tooth 50 has also been fully described. The mechanism which will now be described consists of the mechanism between the dog 50 and the operating shaft 70.

A second arm 172 is provided on the shaft 170 adjacent to the bearing in the outer wall of the body 10 and is provided with a link 173 secured to its outer end and extending rearwardly where it is pivotally connected to a beam 174. The beam 174 is pivotally secured to the body frame by means of a pivot pin 175. The lower arm of the beam 174 is provided with a roller 176 which is placed in position to operate against a rotating cam 177. A cross shaft 181 is rotatably mounted in the rear part of the body 10 and the cam 177 is secured to the outer part of this shaft. A depression 224, formed in the cam 177, allows the beam 174 to operate when the roller 176 is adjacent thereto.

A sprocket 178 is secured to the cam shaft 24 between one of the cams 51 and the wall 21, and a chain 179 operates over this sprocket to drive a second sprocket 180 secured to the inner end of the cross shaft 181. The shaft 181 is used to operate the primary current switch for the welding transformer and also a device which prevents the machine from being stopped in any but the predetermined position.

The sprockets 178 and 180 are of the same size and thus the shaft 181 and the cam shaft 24 rotate in the same direction at the same speed. The importance of stopping the machine within a small predetermined distance has been emphasized and the mechanism provided for normally stopping the machine each tenth revolution of the cam shaft within this small degree has been explained.

It has been stated, however, that a separate mechanism is provided so that the operator may stop the machine within this predetermined distance at the end of any revolution of the cam shaft. If this precaution was not taken the machine might be stopped when the welding current was on, which would damage the work considerably; or the machine might be stopped when the clamping mechanism was engaged which would prevent the work from being removed.

The cam 177 is provided so that even though the manual stopping mechanism is operated at any time, the stopping mechanism proper will only operate during that portion of the cycle in which it is desirable to stop the cam shaft.

The ratchet dog 50 is slidably mounted for vertical reciprocation in a suitable bearing 223 extending inwardly from a removable cover plate 182 secured to the front wall 17 of the body 10. A bell crank 183 is pivotally mounted between a pair of ears 184 which extend inwardly from the bearing 223. A ball end 185 is formed on the horizontal arm of the bell crank 183 and connects with the dog 50 so that a rearward movement of the upwardly extending arm of the bell crank 183 will lift the dog 50 away from the ratchet tooth 49.

A plunger and spring, 186 and 187 respectively, are provided in a vertical bore in the dog 50 and contact with the ball end 185 so that the dog may be moved upwardly by the tooth 49 without moving the bell crank 183. However, a rearward movement of the bell crank positively lifts the dog 50.

A shaft 188 is reciprocally mounted in a bearing 189 secured in the rear wall of the body 10. The forward end of the shaft 188 is secured in one of the vertical positions in the body 10 by means of bearing 190. A rod 191 is secured to the inner end of the shaft 188 adjacent to the bearing 190 and extends forwardly therefrom where it is pivotally connected to the bell crank 183 by means of a clevis 192. A vertical slot 193 is provided near the rear end of the shaft 188 adjacent to the bearing 189 and a ball end 194 formed on the beam 174 is disposed in this slot.

From the foregoing, it may be seen that the shaft 188 will only be permitted to move rearwardly when the cam depression 224 is adjacent to the roller 176. A sleeve 195 is slidably mounted on the shaft 188 over the slot 193 and is held from rotation by a second slot 196 formed in its outer end and which co-acts with the beam 174. A compression spring 197 is mounted on the shaft 188 between the sleeve 195 and the bearing 190. The spring 197 urges the sleeve 195 rearwardly at all times.

A control button 198 is mounted on the outer end of a control rod 199 and is placed in position accessible to the hand of the operator of the machine. The rod 199 extends rearwardly to a position adjacent to the shaft 188 and is slidably mounted in a bearing 200 secured to the body 10. A second compression spring 201 urges the rod 199 outwardly by means of a collar 202 secured to the rod. The inner end of the rod 199 is provided with a clevis 203 which is pivotally connected to a ratchet dog 204, this ratchet dog being pivotally supported on the body frame. The upper side of the sleeve 195 is provided with a ratchet groove 205 into which the dog 204 is constantly urged by the spring 201.

When the cam shaft 24 is started by means of the clutch 35, the cam 177 is rotated by means of the chain 179 and immediately moves the beam 174 forwardly from the position shown in Figure 7. The shaft 188, the sleeve 195, and rod 191 are thereby moved forwardly by the ball end 194. As the sleeve 195 is moved forwardly, the ratchet dog 204 engages the ratchet notch 205. During the remainder of the revolution of the cam shaft 24 the beam 174 is held in this forward position thereby holding the clutch 35 in its engaged position through the ratchet dog 50.

It has been previously shown how the shaft 170 is rotated by the arm 171 during each tenth revolution of the cam shaft 24. When the shaft 170 is thus rotated the arm 172, the link 173, and the beam 174, are also moved rearwardly. The cam 177 is so timed with the cam shaft 24 that the depression 224 is adjacent to the roller 176 when the shaft 170 is rotated. During this movement the beam 174 raises the ratchet dog 50 through the bell crank 183, rod 91, and shaft 188, and allows the spring 47 to rotate the clutch shaft 38 thereby disconnecting the clutch 35 from the bull gear 29. This is the normal procedure followed when the machine is automatically stopped at the end of each tenth revolution.

If the machine is now desired to be stopped at the end of any one revolution, the button 198 is pushed forwardly by the operator thereby compressing the spring 201 and removing the ratchet dog 204 out of the ratchet groove 205. The spring 197 then urges the sleeve 195 rearwardly against the upper end of the beam 174. If, when the button 198 has been pushed forwardly, the depression 224 is not adjacent to the roller 176, the spring 197 will not be able to move the beam 174 rearwardly. However, when this depression 224 rotates into position adjacent to the roller 176, the spring 197 then moves the beam 174 rearwardly and disconnects the main clutch.

When the machine is started by pressing the foot pedal 42 after it has been stopped by the manual operating device, the spring 97 is compressed and the dog 204 holds the spring in this position until it is again desired to stop the machine manually.

With this mechanism the applicant is able to automatically throw the clutch out at the end of every tenth revolution and is also able to manually throw the clutch out at the end of each revolution, both in a very small part of a revolution; and to so time each of these operations that the mechanism will stop in a predetermined position. This is a very advantageous result and one which contributes to the precision of the applicant's machine.

Means are provided in this device for automatically supplying the primary electric current to the welding transformer 124 during that portion of each revolution when the electrodes are in their welding position and the clamping mechanism is applied.

A pair of leads 206, shown in Figure 16, are led up to position adjacent to the outer end of the shaft 181. A terminal 207 is formed on the end of each of these leads and are clamped in position by an insulating block 208.

A bell crank 209 is pivotally mounted on the outer end of the pivot pin 175 and the lower arm of this bell crank 209 is provided with a contact shoe 210 pivotally mounted thereon in position to connect the two terminals 207 together. A spring 211 is secured to the lower arm of the bell crank 209 and urges the shoe 210 into position against the terminals 207.

A pair of similar cams 212 are adjustably mounted on the outer end of the shaft 181 by means of bolts 213 and slots 214 in the cams 212. The pair of cams 212 are so arranged that a roller 215 rotatably mounted in the upper arm of the bell crank 209 may rotate against both of these cams.

When the machine is stopped the position of the cams 212 with respect to the roller 215 is approximately that shown by Figure 16. The roller 215 bears against the raised portion of the cams 212 and prevents the spring 211 from urging the shoe 210 into contact with the terminals 207. The shaft 181 rotates directly with the cam shaft 24 by means of the chain 179 so that when the electrodes are in their welding position the relieved portion of these cams 212 will then allow the spring 211 to move the shoe 210 thereby completing the circuit to the welding transformer.

The different welds required for the several groups of spokes require different welding times. The cams 212 are provided with the slots 214 so that their positions relative to the shaft 181 may be varied to thereby vary the starting and stopping point of the current. Two cams are also provided so that the relieved portion of one cam may overlap the relieved portion of the other cam to thereby shorten or lengthen the effective relieved portion of the pair of cams.

It is thus a simple matter to adjust the length of time during which the welding current is applied, together with the position for starting and stopping the current with reference to the cycle of the machine.

The cross slide 53 is provided with a suitable air inlet 216 from which air is forced through a pipe 217 to a nozzle 218 adjacent to the electrode 92. A continuous stream of air is forced through this pipe which cools the electrodes and thereby prolongs their life.

The procedure for operating this welding machine is to place the rim 227 and hub member 228 on the work holder 131 and to then lay several spokes 226 in the slots 229 in the work holder. The foot pedal 42 is then depressed which throws in the driving clutch 35 and rotates the cam shaft 24 by means of the motor 11.

The cams 51 and 112 move the electrodes and clamping device to their engaged positions, then the cam 212 operates the shoe 210 to supply the primary current to the welding transformer. When the weld is complete, which occupies a time equivalent to about $\frac{1}{8}$ of a revolution of the cam shaft 24, the electrodes and clamping device are moved to their outer positions and the work holder 131 is then indexed $\frac{1}{10}$ of a revolution by means of the indexing mechanism.

This cycle of operations is repeated until the ten spokes are welded and then the cycle timing mechanism throws out the main clutch as previously described.

If at any time during this cycle of operation it becomes necessary to stop the machine, the button 198 is pressed inwardly thereby stopping the cam shaft 24 in the predetermined stopping position for the machine.

Many advantages arise through the use of my improved device and it may be well to summarize here the most important advantages obtained therewith.

I have secured a machine which requires only the insertion of the parts to be welded and which automatically indexes the wheel to perform the various welds without any assistance from the operator of the machine. I have also provided a mechanism wherein the machine can be stopped at the end of any weld and which will insure the stopping of the machine in position so that the work may be removed. I have also provided a cycle timing mechanism of very simple design and which operates during a very small portion of the cycle of the machine.

Still a further advantage results in that I have provided a simple means for compensating for that portion of the spoke lost by the flash of the weld. I have also provided a simple means whereby one electrode may be able to move circumferentially a limited distance with the rim to thereby prevent wearing of the electrode.

Still a further advantage results in that I have provided a very simple means for operating the primary welding current and one which may be conveniently timed in relation to the rest of the machine and with which the duration of the welding time can be conveniently controlled.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a welding machine, a pair of electrodes arranged to reciprocate at substantially right angles to each other, a clamping device, a driven shaft, means secured to said driven shaft for reciprocating said electrodes and clamping device, a work holder arranged for intermittent rotation, a bearing for said work holder pivotally mounted on the body of said welding machine, a gear arranged for axial rotation in line with said pivot, a gear train for driving said gear from said driven shaft, and a second gear train for driving said work holder from said gear.

2. In a welding machine, a driving gear, a driven shaft, means for operatively connecting said driving gear to said driven shaft, a plurality of cams secured to said driven shaft an electrode arranged for vertical reciprocation by means of one of said cams, a second electrode arranged for horizontal reciprocation by means of another of said cams, a clamping device arranged for reciprocation by another of said cams to co-act with one of said electrodes, and a work holder intermittently driven by said driven shaft.

3. In a welding machine, an electrode arranged for substantially vertical reciprocation, a second electrode arranged for substantially horizontal reciprocation, means for resiliently urging one of said electrodes in the plane of reciprocation, and a driving mechanism for reciprocating said electrodes simultaneously.

4. In a welding machine, an electrode arranged for reciprocation, a second electrode arranged for reciprocation at substantially right angles to said first mentioned electrode, means for resiliently urging at least one of said electrodes in the plane of reciprocation, and means for resiliently securing at least one of said electrodes in a plane at right angles to the plane of reciprocation.

5. In a welding machine, a driving gear, a driven shaft, a clutch mechanism for driving said shaft from said driving gear, a second gear mounted on said shaft, a third gear rotatably mounted in mesh with said second mentioned gear, and means operated by said second and third mentioned gears for releasing said clutch during a portion of one of a plurality of revolutions of said driven shaft.

6. In a welding machine, a driving gear, a driven shaft, a clutch mechanism for connecting said gear and shaft, a second gear mounted on said driven shaft, a third gear rotatably mounted in mesh with said second mentioned gear, means fixed on the face of said second mentioned gear co-acting with means slidably secured to the face of said third mentioned gear to operate the said clutch during a portion of one of a plurality of revolutions of said driven shaft.

7. In a welding machine, a driving member, a driven shaft, a clutch member arranged to operatively connect said driving member with said driven shaft, a gear secured to said driven shaft, a second gear rotatably mounted in mesh with said first mentioned gear, a second shaft having an arm extended therefrom, means disposed on the face of said gears to co-act with said arm during a portion of one of a plurality of revolutions of said driven shafts to thereby rotate said second mentioned shaft, a spring urging said clutch member out of engagement with said driving member, a ratchet tooth arranged to hold said clutch member into said engagement against the force of said spring, and means for releasing the said ratchet tooth when the said second mentioned shaft is rotated.

8. In a welding machine, a driving member, a driven shaft, a clutch arranged to operatively connect said member and shaft, a gear secured to said shaft, a second gear rotatably mounted to mesh with said first mentioned gear, means controlled by said gears for releasing said clutch during a predetermined part of one of a plurality of revolutions of said shaft, a manual means for releasing said clutch, and a means synchronously driven by said driven shaft for controlling said manual clutch releasing means.

9. In a welding machine, a driving member, a driven member, a clutch arranged to operatively connect said driving and driven members, a spring arranged to resiliently urge said clutch out of said engagement, means arranged to hold said clutch into engagement against the force of said spring, a second spring resiliently urging said means to position so that said clutch may be engaged, a manually operated means arranged to hold said first mentioned means against the action of said second mentioned spring, and a third means driven in synchronism with the said driven member for holding said first mentioned means against the force of said second mentioned spring.

10. In a welding machine, a driving member, a driven shaft, means for operatively connecting said driving member and shaft, a spring urging said means out of engagement, a ratchet tooth and dog resisting the action of said spring, means operated by said driven shaft for releasing said dog during a predetermined portion of one of a number of revolutions of the said driven shaft, means for urging said dog out of engagement with said tooth, manual operatable means for resisting the action of said urging means, and means synchronously driven by said driving shaft for controlling the action of the said urging means against the said dog.

11. In a welding machine, a driven shaft, a plurality of electrodes arranged for reciprocation, means disposed on said shaft for reciprocating the said electrodes, a second shaft driven synchronously with the said driven shaft, a pair of cams secured to the said second mentioned shaft so as to be adjusted relative to each other and to said shaft, a transformer arranged to supply current to the said electrodes, and a switch arranged to supply current to the said transformer, the duration of the current supplied by said switch depending upon the position of said cams relative to each other.

12. In a welding machine, a pair of electrodes, a slide member reciprocally mounted in said welding machine and having one of said electrodes secured thereto, a head slidably mounted within said slide, positive adjustable means for preventing movement of said head in relation to the said slide in one direction of reciprocation, and resiliently adjustable means for preventing movement of the said head in relation to the said slide in the other direction of reciprocation, and means for reciprocating the said head to thereby reciprocate said slide through said positive and resilient means.

13. In a welding machine, a pair of electrodes, a slide arranged to reciprocate within said machine and secured to one of said electrodes, a head arranged to reciprocate within said slide, means adjustably secured in the plane of reciprocation to said head, a spring disposed between said means and said slide, and a second means for adjustably positioning said head within said slide, the parts being so arranged that the said first mentioned means will remain stationary relative to said slide when said second mentioned means is adjusted to thereby maintain a constant pressure on said spring while said head is being adjusted relative to said slide.

14. In a welding machine, a driving gear, a driven shaft, a clutch slidably mounted on said driven shaft in position to co-act with said driving gear, a slide arranged for vertical reciprocation, a pair of cams having a pair of cam grooves therein secured to said driven shaft, means operated by said cam